(12) United States Patent
Bhat et al.

(10) Patent No.: US 10,069,629 B2
(45) Date of Patent: Sep. 4, 2018

(54) CONTROLLED ACCESS TO DATA IN A SANDBOXED ENVIRONMENT

(71) Applicant: AIRWATCH LLC, Atlanta, GA (US)

(72) Inventors: Vijaykumar Bhat, Bangalore (IN); Ramani Panchapakesan, Bangalore (IN); Ilanchezhian Kuppusamy, Bangalore (IN); Gangadhar Nittala, Bangalore (IN)

(73) Assignee: AIRWATCH LLC, Atlanta, GA (US)

( * ) Notice: Subject to any disclaimer, the term of this patent is extended or adjusted under 35 U.S.C. 154(b) by 31 days.

(21) Appl. No.: 14/828,538

(22) Filed: Aug. 18, 2015

(65) Prior Publication Data

US 2016/0371495 A1  Dec. 22, 2016

(30) Foreign Application Priority Data

Jun. 17, 2015 (IN) .............. 3038/CHE/2015

(51) Int. Cl.
*G06F 21/60* (2013.01)
*H04L 9/14* (2006.01)
*G06F 21/53* (2013.01)
*H04L 9/08* (2006.01)
*H04L 9/30* (2006.01)
*G06F 21/44* (2013.01)

(52) U.S. Cl.
CPC .............. *H04L 9/14* (2013.01); *G06F 21/445* (2013.01); *G06F 21/53* (2013.01); *G06F 21/606* (2013.01); *H04L 9/0816* (2013.01); *H04L 9/30* (2013.01); *G06F 2221/033* (2013.01)

(58) Field of Classification Search
CPC ........... G06F 21/30; G06F 21/62; G06F 21/60
See application file for complete search history.

(56) References Cited

U.S. PATENT DOCUMENTS

| 2014/0177839 A1* | 6/2014 | Wagner ................ H04L 9/0822 380/259 |
| 2016/0085602 A1* | 3/2016 | Jacobson ............... G06F 9/546 726/30 |

* cited by examiner

*Primary Examiner* — Izunna Okeke
(74) *Attorney, Agent, or Firm* — Thomas Horstemeyer, LLP

(57) ABSTRACT

Disclosed are various examples of systems and methods for transferring data between applications executing in sandboxed environments. An application executing on a computing device in a sandbox provided by an operating system is identified. A key-value pair is retrieved from an access-restricted data store provided by the operating system, wherein the key-value pair comprises a timestamp and an application identifier. The application identifier is compared with the application. Data is sent to the application based at least in part on the application identifier matching an identification of the application and the timestamp specifying a point in time within a predetermined period of time.

20 Claims, 7 Drawing Sheets

CONTROLLED ACCESS TO DATA IN A SANDBOXED ENVIRONMENT

RELATED APPLICATIONS

Benefit is claimed under 35 U.S.C. 119(a)-(d) to Foreign application Serial No. 3038/CHE/2015 filed in India entitled "CONTROLLED ACCESS TO DATA IN A SANDBOXED ENVIRONMENT", on Jun. 17, 2015, by AIRWATCH LLC, which is herein incorporated in its entirety by reference for all purposes.

BACKGROUND

Operating systems for computing devices can provide or require execution of an application to occur in a sandbox. For example, Apple's iOS® operating system requires that each application executing on an iPhone or iPad execute in its own sandbox. An application executing in a sandbox operates in an isolated environment and is limited to accessing hardware resources and/or files or applications assigned to the sandbox. This prevents the application executing in the sandbox from accessing resources, either inadvertently or surreptitiously, for which the application does not have permission. For example, two applications executing in two sandboxes on the same computer can be unaware of each other and/or unable to communicate with each other through various interprocess communication facilities provided by the operating system.

However, two applications executing in separate sandboxes on the same computing device can have a need to communicate with each other. For example, one application can have a need to share a file or other data with the other application. Some operating systems can provide a secure communications framework to allow two sandboxed applications to communicate with each other. For example, some versions of Apple's iOS® provide the Extensions Framework to allow limited communication between applications executing on an iOS® device. Similar functionality is provided in some versions of Apple's OSX®. An application implementing an Extension, such as the Share File Extension, is able to share a file with any other application on the same device that implements the Share File Extension.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various examples for controlling access to data in a sandboxed environment. An operating system of a computing device can isolate an application in a sandbox or a virtualized execution environment. Each application isolated in a sandbox is generally unable to access data or resources outside of the sandbox. However, an operating system can provide specific facilities, such as specific frameworks or application programming interfaces (APIs), that a sandboxed application can use to access data and/or resources outside of the sandbox on a limited basis.

For example, Apple's iOS® operating system and some versions of Apple's OSX® operating system isolate each application in its own sandbox. Therefore, each application installed on a computing device with iOS® or OSX® is limited by default to accessing its own data (e.g., user files created with the application) that is stored in the application's sandbox. However, some versions of iOS® provide an extensions framework. Applications that implement one or more extensions (e.g., a document provider extension) are able to allow other applications to access data located in the application's sandbox. However, the extensions framework provided by iOS® does not allow for an application to limit or identify which other applications are able to access data in the application's sandbox. Every application installed on the computing device can access data in the sandbox of the application implementing the extension. However, use of additional interprocess communication frameworks provided by iOS®, as further discussed below, allows for out-of-band communication between applications in order to limit access to data within an application's sandbox to particular, authorized applications.

Figure 1:
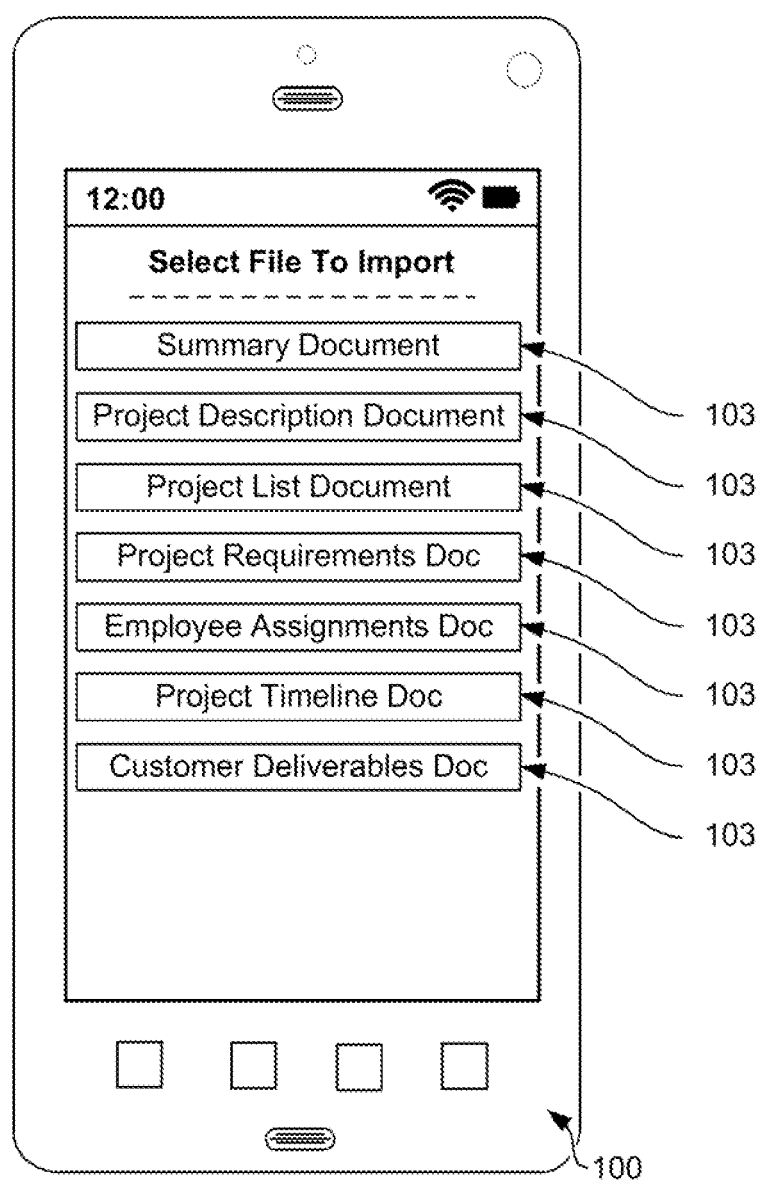
FIG. 1 is a drawing depicting the operation of various examples of the disclosure.

With reference to FIG. 1, shown is an example of a computing device 100 executing an application. As depicted, the user is attempting to access files located within the sandbox of a first application from the user interface of a second application that is executing within its own sandbox on the same computing device 100. The second application is presenting the user with a list of files 103 that the user can choose to import from the first application. These files may be unavailable to import if the user were attempting to access or import these files from the user interface of a third application executing on the computing device 100, as further described below.

Figure 2:
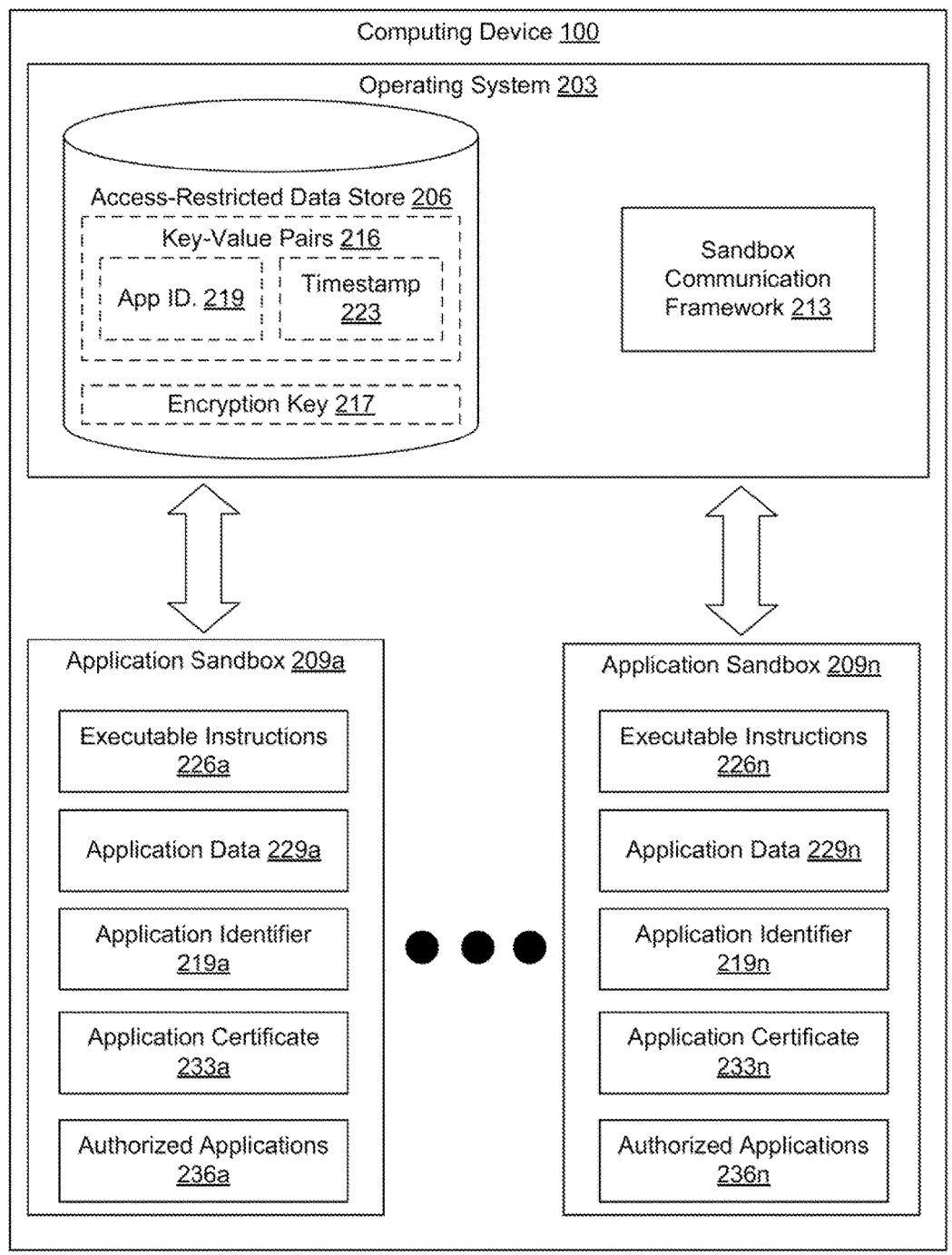
FIG. 2 is a schematic block diagram depicting a computing device according to various examples of the present disclosure.

With reference to FIG. 2, shown is a schematic block diagram of a computing device 100. The computing device 100 can include a processor-based system, such as a computer system. Such a computer system can be embodied in the form of a desktop computer, a laptop computer, personal digital assistants, cellular telephones, smartphones, set-top boxes, music players, web pads, tablet computer systems, game consoles, electronic book readers, or other devices with like capability. The computing device 100 can include a display. The display can include one or more devices such as liquid crystal display (LCD) displays, gas plasma-based flat panel displays, organic light emitting diode (OLED) displays, electrophoretic ink (E ink) displays, LCD projectors, or other types of display devices. The computing device 100 can also include one or more input mechanisms for users to interact with applications executing on the computing device 100, such as keyboards, mice, touchscreen displays, microphones, or other input mechanisms.

An operating system 203 can manage the hardware and software resources of the computing device 100. Examples of operating systems include Apple's iOS® and OSX®, Google's Android® and ChromeOS® operating systems, Amazon's FireOS®, Microsoft's Windows® operating systems, various Linux® distributions, FreeBSD®, OpenBSD®, NetBSD®, as well as other operating systems. The operating system 203 can, for example, provide scheduling and multi-tasking services for applications or processes executing on the computing device 100, such as time-sharing or preemptive multitasking systems. The operating system 203 can also, for example, allocate memory and other resources to applications executing on the computing device 100. For example, the operating system 203 can allocate portions of memory for an access-restricted data store 206 or portions of memory for one or more application sandboxes 209a-n. The operating system 203 can also act as an intermediary interface for applications executing on the computing device 100 to access the hardware and software resources of the computing device by providing a standardized application programming interface (API) of system calls. For example, the operating system 203 can provide a sandbox communication framework 213 that allows applications executing in different application sandboxes 209 to communicate with each other.

The access-restricted data store 206 is a data store where the ability to write to, read from, or modify data within the data store is limited according to one or more criteria. For example, the ability to write to, read from, or modify data within the access-restricted data store 206 can be limited to specific users, groups of users, applications, groups of applications, computers, groups of computers, or other criteria. In some examples, multiple access-restricted data stores 206 can be provided by the operating system 203. For example, each user, group of users, application, group of applications, computer, or group of computers can have its own access-restricted data store 206 available for securely storing data. Examples of access-restricted data stores 206 include Apple's iOS® keychain or Apple's OSX® keychain.

Data stored in the access-restricted data store 206 can include one or more key-value pairs 216, an encryption key 217, and potentially other data. A key-value pair 216 can include an application identifier 219 and a timestamp 223, the uses of which are further described below. Other examples of key-value pairs 216 include username and password pairs, variable names and values, or any other tuple. The encryption key 217 represents a key used to encrypt or decrypt data, as further discussed below. The encryption key 217 can correspond to a shared secret used with symmetric encryption algorithms, a public key used with asymmetric encryption algorithms, or a private key used with asymmetric encryption algorithms.

The sandbox communication framework 213 can include system calls or application programming interfaces (APIs) made available to applications executing within an application sandbox 209. These system calls and APIs can provide various functions, such as the ability for applications executing in separate application sandboxes 209 to communicate with each other or share data with each other in a controlled manner. For example, an application executing in a first sandbox may be unable to send messages to and receive responses from another application executing in a sandbox using traditional interprocess communications mechanisms. However, the application may be able to call a function included in the sandbox communication framework 213 and provide an identifier of the other application and the contents of a message to be sent to the other application. The function called may return a response from the other application. Examples of sandbox communications frameworks include the extensions framework made available to applications by Apple's iOS® operating system.

The application sandbox 209 represents a sandbox or similar virtualized execution environment for applications executing on the computing device 100. The application sandbox can segregate the memory, or a portion of memory, into a separately addressable set of memory addresses that are accessible only to the application. Functionality of the computing device 100 outside the scope of the application sandbox 209, such as the contents of memory not allocated to the application sandbox 209 or hardware functionality of the computing device 100 not specifically assigned to the application sandbox 209, are unavailable to processes executing within the application sandbox 209. Attempts to access these memory locations or hardware functionality can be ignored and/or rejected by the operating system 203. Further, these memory locations and hardware functionality can be invisible to the applications executing within the application sandbox 209.

An application sandbox 209 can include a set of executable instructions 226 corresponding to an application executing in the application sandbox 209, application data 229, an application identifier 219 that uniquely identifies the application executing within the application sandbox 209, an application certificate 233, and/or potentially other instructions or data.

The executable instructions 226 can represent the set of computer and/or processor instructions to be performed by the computing device 100 when executing an application. The executable instructions 226 can, for example correspond to processor specific binary instructions or to higher-level computer instructions that are interpreted or compiled at run time.

The application data 229 can represent the data available to, used by, or generated by the application corresponding to the executable instructions 226. Application data 229 can include files, settings, or other data. Application data 229 for an email application, for example, can include individual email messages, attachments to email messages, contact information for other individuals (e.g., vCards), server settings for sending and receiving email, configuration settings for the email application, log data generated by the email application as a result of execution (e.g., logging the results of sending and/or receiving emails), and potentially other data.

The application identifier 219 can represent a unique signature or other identifier for the application executing within the application sandbox 209. The application identifier 219, for example, can correspond to a unique signature generated from or otherwise based at least in part on the executable instructions 226 of the application executing in the application sandbox 209. For example, the executable instructions 226 could be supplied to a hash-function (e.g., message digest 5, secure hash algorithm-1, secure hash algorithm-2, secure hash algorithm-3) to generate a cryptographically unique signature for the executable instructions 226. As another example, the executable instructions 226 could be cryptographically signed using a private key included in or associated with the application certificate 233, as is further discussed below, in order to create a unique signature for the executable instructions 226. In some examples, the application identifier 219 can also uniquely identify the application sandbox 209. For example, in instances where applications executing on the computing device 100 are contained within their own application sandbox 209, the application identifier 219 can serve to uniquely identify the application sandbox 209 as well as the application.

The application certificate 233 can correspond to a cryptographic certificate or public-private encryption key pair. The application certificate 233 can be used to perform various cryptographic operations, such as verify the identity of the application or applications executing in the application sandbox 209. In some examples, the application certificate 233 can also be used to verify the integrity of the executable instructions 223 or the application data 229 to ensure that neither the executable instructions 226 nor the application data 229 has been modified accidentally or in an unauthorized manner.

The authorized applications 236 can represent a list of the application identifiers 219 or application certificates 233 of applications that are allowed to access the application data 229 within the application sandbox. The authorized applications 236 can be used to limit the applications that can access the application data 229 within the application sandbox 209 to those applications with an application identifier 219 or application certificate 233 included in the authorized applications 236. For example, the application can refuse to send application data 229 to a requesting application or send the application data 229 in encrypted form if the requesting application is not included among the authorized applications 236. This can be in addition to any limitations, permissions, or other security functionality provided by the operating system 203.

Next, additional description of the operation of the computing device 100 is provided. To begin, a first application can execute in a first application sandbox 209a. During the course of execution, the first application can receive a request communicated through the sandbox communication framework 213 from a second application executing in a second application sandbox 209n. The request can specify some portion of the application data 229a within the application sandbox 209a of the first application to which the second application requests access.

The first application can then obtain the application identifier 219n of the second application. For example, the first application can request the application identifier 219n of the second application using one or more functions provided by the sandbox communication framework 213. In some instances, the application identifier 219n can be provided by the second application as part of the request for the application data 229a.

The first application can then attempt to retrieve a key-value pair 216 from the access-restricted data store 206 using the application identifier 219n of the second application as the key. If no key-value pair 216 exists with the application identifier 219 of the key-value pair 216 matching the application identifier 219n of the second application, the request for the application data 229a can be rejected. The key-value pair 216 can be saved to the access-restricted data store 206 when the second application first requests to access the application data 229a of the first application. However, if such a key-value pair 216 exists, then the first application can analyze the timestamp 223 recorded in the key-value pair 216 to determine when the key-value pair 216 was generated. If the timestamp 223 indicates a point in time within a predefined or predetermined period of time prior to the first application receiving the request from the second application, then the first application can determine that the request is valid. The predetermined period of time can include a half a second, one second, five seconds, or some other period of time. However, if the timestamp 223 falls outside the predefined or predetermined period of time, then the first application can determine that the request is untimely, stale, erroneous, and/or even potentially fraudulent or malicious. If the key-value pair 216 exists and the timestamp 223 falls within a valid range of time, then the first application can send the requested application data 229a to the second application.

In another example, the first application can bypass checking for a key-value pair 216 in the access-restricted data store 206 and send an encrypted copy of the requested application data 229a to the second application. In a first instance of such an example, the first application can generate an encryption key 217 to encrypt the application data 229a using a symmetric-key encryption algorithm. Examples of a symmetric-key encryption algorithm include various versions of the advanced encryption standard (AES) algorithm, the digital encryption standard (DES) algorithm, the triple DES (3DES) algorithm, the Twofish algorithm, the Blowfish algorithm, the Serpent algorithm, or other algorithms. The first application then saves a copy of the encryption key 217 to the access-restricted data store 206. For example, in instances where the access-restricted data store 206 corresponds to the keychain in iOS® or OSX®, the ability of applications to write data to and read data from the access-restricted data store 206 may be based at least in part on whether the first and second application are from the same developer (e.g., signed by the same developer key) and/or from the same family of applications (e.g., sharing an identifier that indicates the applications are related, such as a bundle seed identifier). Applications that are not signed with the same developer key or share the same bundle identifier would be unable to share data with each other using the access-restricted data store 206.

In this example, the second application receives the requested application data 229a. The second application can then attempt to retrieve the encryption key 217 from the access-restricted data store 206. If the second application is authorized to retrieve the encryption key 217 from the access restricted data store 206, then the second application can retrieve the encryption key 217 and use it to decrypt the application data 229a. If the second application is unauthorized to retrieve the encryption key 217 from the access restricted data store 206, then the second application can be unable to decrypt the requested application data 229a. In this example, limiting the ability of an application to read data from the access-restricted data store 206 serves as a permission mechanism for limiting access to the application data 229a by applications executing in a different application sandbox 209n.

In a second instance of this example, the first application can bypass checking for a key-value pair 216 in the access-restricted data store 206 and send an encrypted copy of the requested application data 229a to the second application. However, the first application can use an asymmetric encryption algorithm to uniquely encrypt the requested application data 229a so that only the second application can decrypt it. In this instance, the first application can use the public key identified in the application certificate 233a of the second application to encrypt the requested application data 229a. The first application can then send the encrypted application data 229a to the second application. If the application certificate 233n of the second application shares the same application certificate 233n as the first application, then the second application can use the private key identified in the application certificate 233n of the second application to decrypt the requested application data 229a. Applications that do not share an application certificate 233, such as applications issued by different authors or providers, may be unable to share application data 229 with each other.

Although the examples of using a timestamp 223 with an application identifier 219 and using encryption will be described separately, the two examples provided can also be combined. For example, application data 229 may be encrypted in order to prevent unauthorized applications from reading the application data 229 as a result of a manipulation of a security vulnerability within the operating system 203 and/or sandbox communication framework 213. However, in order for authorized applications to determine that the encrypted application data 229 they are receiving is not stale, a timestamp 223 can also be used in the manner described above.

Figure 3A:
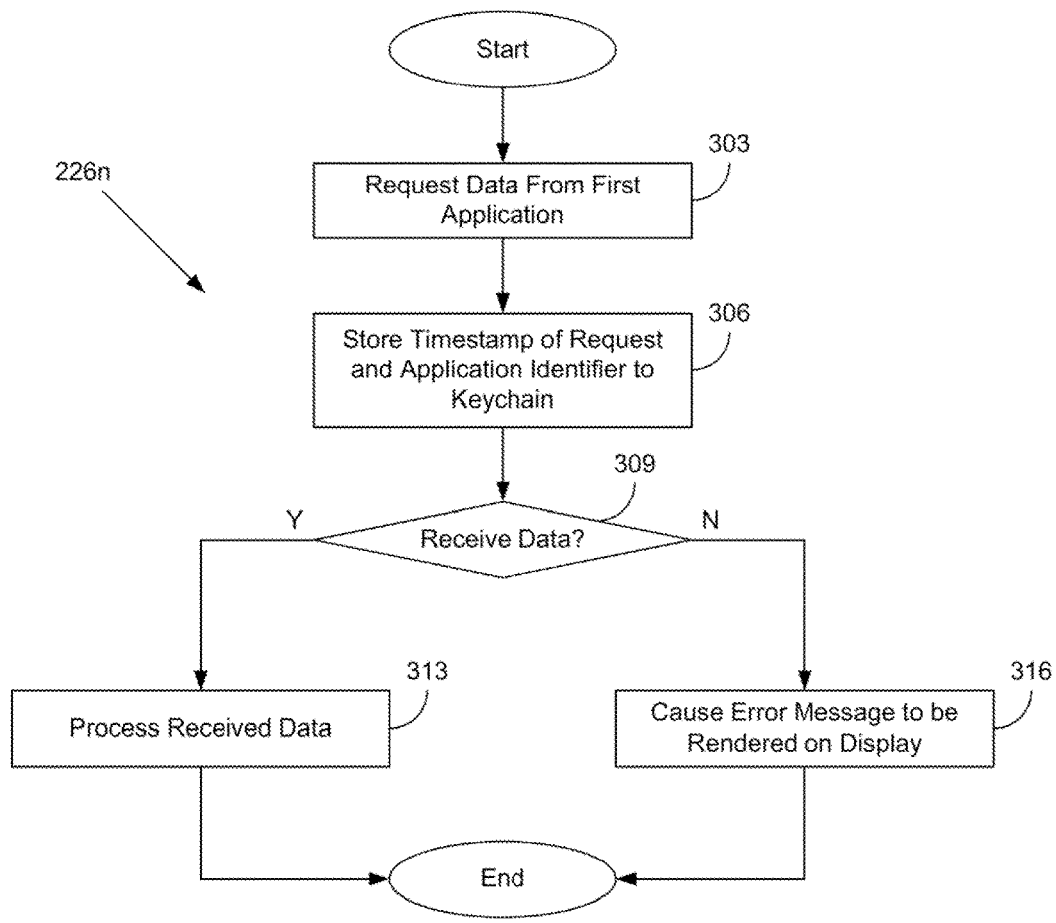
FIG. 3A is a flowchart illustrating one example of functionality according to various examples of the disclosure.

Referring next to FIG. 3A, shown is a flowchart that provides one example of the operation of a portion of the executable instructions 226n of a second application requesting data from a first application. As an alternative, the flowchart of FIG. 3A can be viewed as depicting an example of elements of a method implemented in the computing device 100.

Beginning with step 303, the second application can request application data 229a from the first application. The second application can, for example, make a call to a function provided by the sandbox communication framework 213 of the operating system 203 of the computing device 100. The called function can, in turn, relay the request to the first application or can make a request on behalf of the second application to the first application.

Proceeding to step 306, the second application can saves a key-value pair 216 to an access-restricted data store 206 that is accessible by the first application and the second application. As part of the key-value pair 216, the second application can include its application identifier 219n as the application identifier 219 of the key-value pair 216 and can generate a timestamp 223 to save as part of the key-value pair 216, where the timestamp can indicate the time at which the key-value pair 216 was created or the at which the request for application data 229a was sent to the first application.

Moving on to step 309, the second application can determine whether the application data 229a that it requested from the first application has been received. The second application can, for example, wait for a predetermined or predefined period of time before making such a determination. If the requested application data 229a is not received within that period of time, the request can time out, indicating that the request for the application data 229a was rejected or denied. If the requested application data 229a is received, execution of the process proceeds to step 313. If the requested application data 229a is not received, then execution of the process proceeds to step 316.

Referring next to step 313, the second application can process the received data 313. In some examples, this can include the additional steps of decrypting the received application data 229a using one or more of the approaches described below. If no decryption is necessary, then the second application can use the requested data 229a for the purpose for which it was requested. For example, an email application that received a requested file can attach the requested file to a message. Execution of the process subsequently ends.

However, if execution of the process proceeds instead to step 316, the second application can cause an error message to be rendered on the display of the computing device 100 to indicate to a user that the application data 229a could not be retrieved from the first application. The error message can indicate the reason why the application data 229a could not be retrieved (e.g., lack of authorization or permission to access the requested application data 229a, as well as other information. Execution of the previously described process subsequently ends.

Figure 3B:
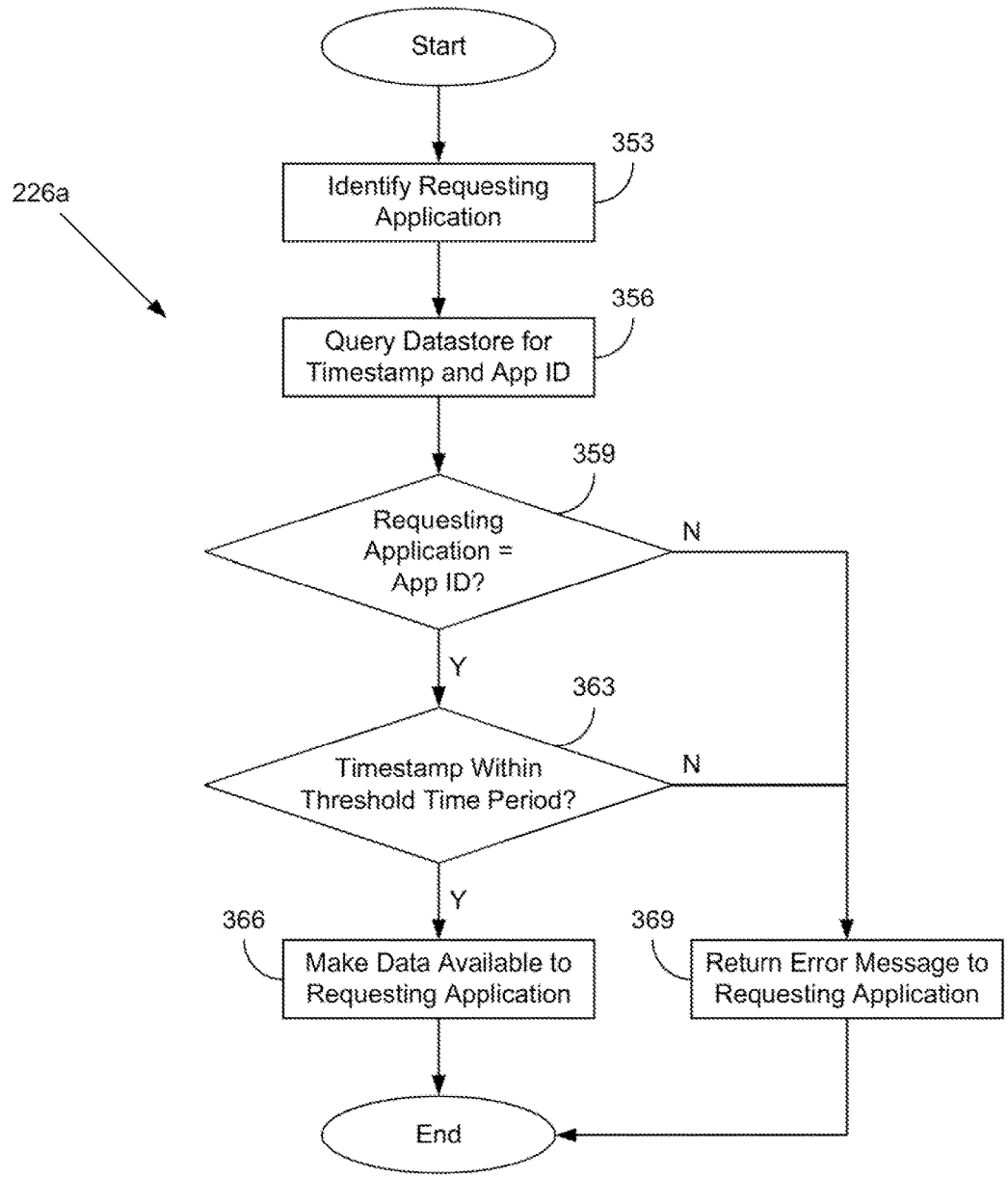
FIG. 3B is a flowchart illustrating one example of functionality according to various examples of the disclosure.

Referring next to FIG. 3B, shown is a flowchart that provides one example of the operation of a portion of the executable instructions 226a of the first application sending application data 229a to a second application. As an alternative, the flowchart of FIG. 3B can be viewed as depicting an example of elements of a method implemented in the computing device 100.

Beginning with step 353, the first application identifies the second application by obtaining the application identifier 219n of the second application. For example, the first application can send a request for the application identifier 219n to the second application using the sandbox communication framework 213. As another example, the second application can have included its application identifier 219n in its request to the first application for the application data 229a, and the first application can obtain the application identifier 219n by parsing the request.

Proceeding next to step 356, the first application can retrieve a key-value pair 216 from the access-restricted data store 206. The key-value pair 216 can include an application identifier 219 and a timestamp 223. The first application can, for example, query the keychain provided by iOS® and OSX® or a similar access-restricted data store 206 provided by other operating systems.

Moving on to step 359, the first application can compare the application identifier 219 stored in the retrieved key-value pair 216 with the application identifier 219n obtained from the second application. If the application identifier 219 of the key-value pair 216 matches the application identifier 219n of the second application, then the second application can be authorized to access the application data 229a of the first application, and execution of the previously described process continues to step 363. However, if the application identifier 219 of the key-value pair 216 does not match the application identifier 219n of the second application, or a key-value pair 216 does not exist in the access-restricted data store 206, then this indicates that the second application is not authorized to access the application data 229a of the first application. In this case, execution of the process proceeds to step 369.

Referring next to step 363, the first application can determine whether the timestamp 223 of the key-value pair 216 falls within a predetermined or predefined period of time prior to receipt from the second application of the request for the application data 229a. For example, the first application can determine whether the timestamp 223 represents a time less than 100 millisecond, less than 1 second, or less than 5 seconds prior to the time that the first application received the request from the second application. If the timestamp 223 falls within the time period, then the first application can determine that the request for the application data 229a is current and valid. In such a case, execution of the process proceeds to step 366. However, if the timestamp 223 falls outside the period of time, this can indicate that the request is stale, old, a forgery, or that there is some other problem with the request from the second application for the application data 229a of the first application. In such case, execution of the process proceeds to step 369.

Proceeding next to step 366, the first application makes the requested application data 229a available to the second application. The first application can, for example, provide the application data 229a in a response to the second application made through the sandbox communication framework 213. After providing the application data 229a, execution of the previously described portion of the process subsequently ends.

However, if execution of the process proceeds to step 369, the first application can return an error message to the second application. The error message can include, for example, an indication that the request for the application data 229a of the first application is denied and/or can include a reason that the request for the application data 229a was denied. Execution of the previously described portion of the process subsequently ends.

Figure 4A:
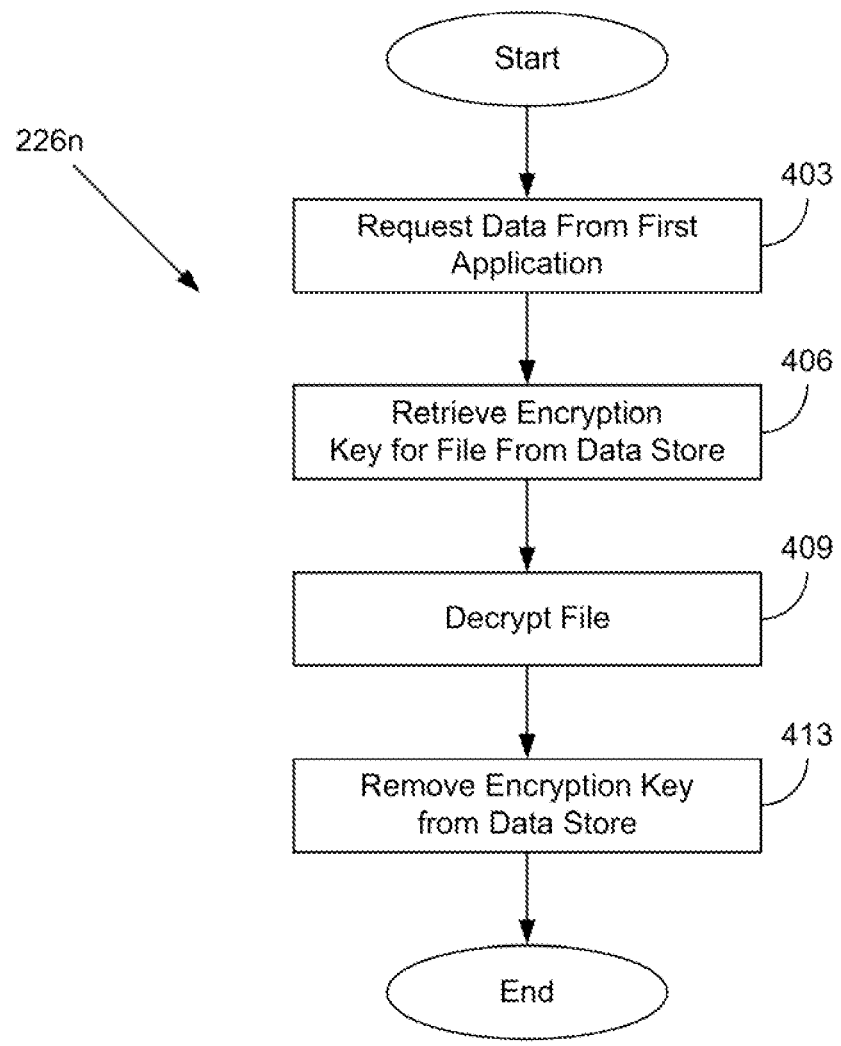
FIG. 4A is a flowchart illustrating one example of functionality according to various examples of the disclosure.

Referring next to FIG. 4A, shown is a flowchart that provides one example of the operation of a portion of the executable instructions 226n of a second application requesting data from a first application. As an alternative, the flowchart of FIG. 4A can be viewed as depicting an example of elements of a method implemented in the computing device 100.

Beginning with step 403, the second application can request application data 229a from the first application. The second application can, for example, make a call to a function provided by the sandbox communication framework 213 of the operating system 203 of the computing device 100. The called function can, in turn, relay the request to the first application or make a request on behalf of the second application to the first application.

Proceeding on to step 406, the second application can retrieve an encryption key 217 from the access-restricted data store 206. If no encryption key 217 for the received application data 229a is stored in the access-restricted data store, then the second application may be unauthorized to access the application data 229a and execution of the previously described process ends. Assuming that the second application retrieves an appropriate encryption key 217 from the access-restricted data store 216, the process proceeds to step 409.

Moving to step 409, the second application can decrypt the received application data 229a using the encryption key 217 and an appropriate encryption algorithm. The algorithm used to encrypt and decrypt the application data 229a can be determined or defined in advance. For example, the algorithm to be used can have been hardcoded into the first application and the second application during compilation or interpretation of the first application and the second application. The algorithm can include one or more symmetric or asymmetric algorithms. Alternatively, the application can be configured with a profile that specifies an appropriate encryption algorithm and/or includes the actual algorithm. In one example, an administrator of the application may define or create the profile through a console portion of a management server, and the management server can transmit the profile to the application.

Referring next to step 413, the second application can remove the encryption key 217 from the access-restricted data store 206 after the application data 229a has been decrypted. Removing the encryption key 217 can help protect the application data 229a from being subsequently decrypted by an unauthorized application. Execution of the previously described process subsequently ends.

Figure 4B:
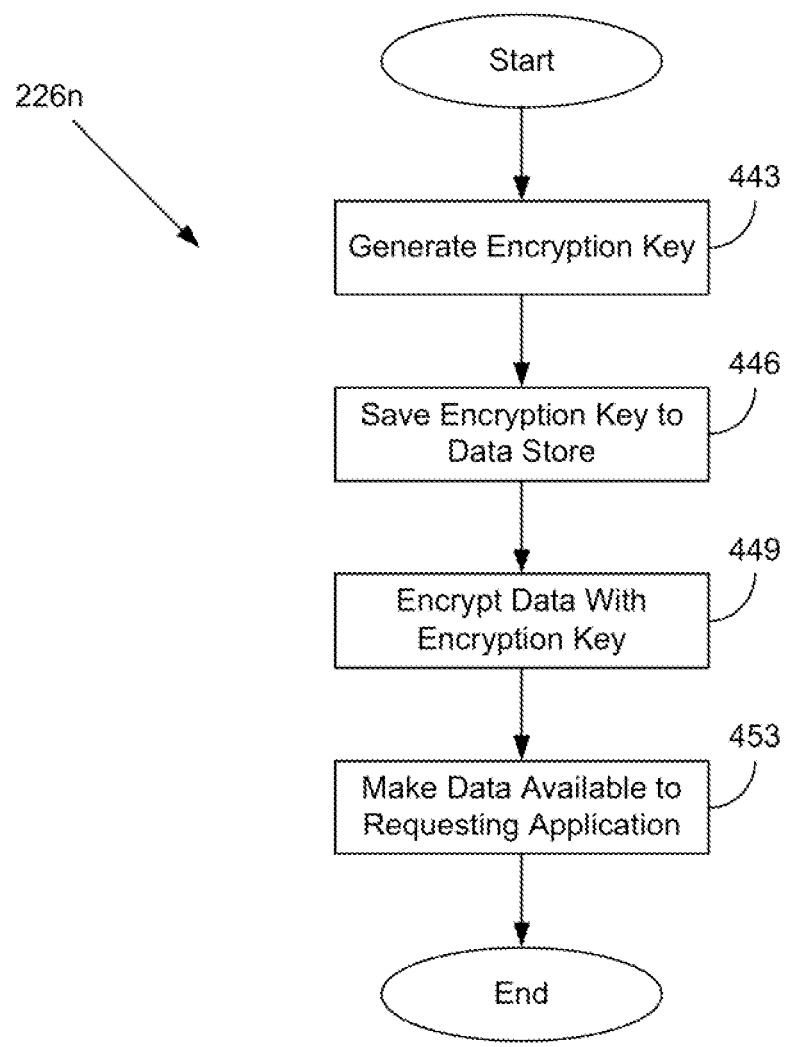
FIG. 4B is a flowchart illustrating one example of functionality according to various examples of the disclosure.

Referring next to FIG. 4B, shown is a flowchart that provides one example of the operation of a portion of the executable instructions 226a of a first application providing data to a second application. As an alternative, the flowchart of FIG. 4B can be viewed as depicting an example of elements of a method implemented in the computing device 100.

Beginning with step 443, the first application can generates an encryption key 217. The encryption key 217 can be generated randomly (e.g., as the result of a call to a random number generator). For algorithms with known classes of weak keys, such as DES or Blowfish, the first application can determine if the randomly generated encryption key 217 falls within the class of known weak keys. If the generated encryption key 217 is a weak key, then a new encryption key 217 can be randomly generated and the process repeated until a suitable encryption key 217 is generated.

Moving on to step 446, the first application can save the encryption key 217 to the access-restricted data store 206. By saving the encryption key 217 to the access restricted data store 206, the applications that are able to decrypt (and therefore access) the application data 229a are limited to those applications that can read the encryption key 217 from the access-restricted data store 206. Proceeding next to step 449, the first application then encrypts the requested application data 229a with the generated encryption key 217 using one or more of the algorithms previously discussed above.

Referring next to step 453, the first application can makes the encrypted version of the application data 229a requested by the second application available to the second application. The first application can, for example, provide the application data 229a in a response to the second application made through the sandbox communication framework 213. After providing the application data 229a, execution of the previously described portion of the process subsequently ends.

Figure 4C:
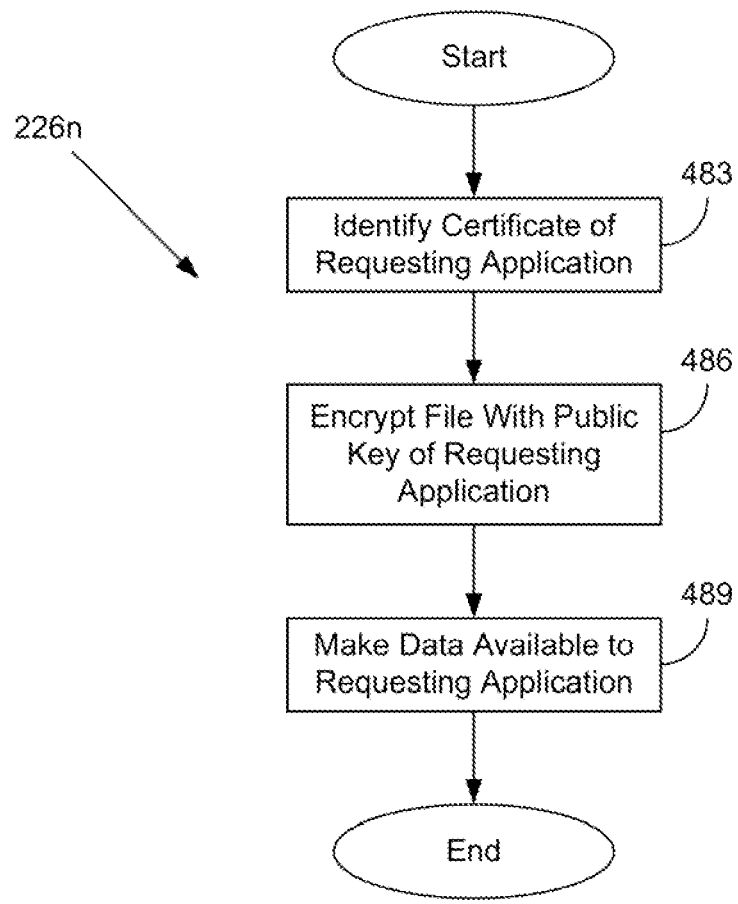
FIG. 4C is a flowchart illustrating one example of functionality according to various examples of the disclosure.

Referring next to FIG. 4C, shown is a flowchart that provides one example of the operation of a portion of the executable instructions 226a of a first application providing data to a second application. As an alternative, the flowchart of FIG. 4C can be viewed as depicting an example of elements of a method implemented in the computing device 100.

Beginning with step 483, the first application can identify an application certificate 233n corresponding to the second application that is requesting the application data 229a stored in the application sandbox 209a of the first application. The application certificate 233n can be identifiable because it was included in the request for the application data 229a. For example, the application certificate 233n can have been a value passed to a function call provided by the sandbox communication framework 213 for requesting the application data 229a. As another example, the first application can use a function provided by the sandbox communication framework 213 to request a copy of or an identifier of the application certificate 233n from the application sandbox 209n of the second application. In some instances, the application certificate 233a of the first application can be the same as the application certificate 233n of the second application, such as when the two applications are from the same author or provider.

Moving on to step 486, the first application can encrypt the requested application data 229a with the public key of the second application. The public key can be identified in or retrieved from the application certificate 233n of the second application. By encrypting the requested application data 229a with the public key of the second application, only the second application is able to decrypt the requested application data 229a, limiting access to the application data 229a in the application sandbox 209a of the first application.

Proceeding next to step 489, the first application can make the encrypted version of the application data 229a requested by the second application available to the second application. The first application can provide the application data 229a in a response to the second application made through the sandbox communication framework 213. After providing the application data 229a, execution of the previously described portion of the process subsequently ends.

The flowcharts of FIGS. 3A, 3B, 4A, 4B, and 4C show examples of the functionality and operation of implementations of components described herein. The components described herein can be embodied in hardware, software, or a combination of hardware and software. If embodied in software, each element can represent a module of code or a portion of code that includes program instructions to implement the specified logical function(s). The program instructions can be embodied in the form of source code that includes human-readable statements written in a programming language and/or machine code that includes machine instructions recognizable by a suitable execution system, such as a processor in a computer system or other system. If embodied in hardware, each element can represent a circuit or a number of interconnected circuits that implement the specified logical function(s).

Although the flowcharts of FIGS. 3A, 3B, 4A, 4B, and 4C show a specific order of execution, it is understood that the order of execution can differ from that which is shown. The order of execution of two or more elements can be switched relative to the order shown. Also, two or more elements shown in succession can be executed concurrently or with partial concurrence. Further, in some examples, one or more of the elements shown in the flowcharts can be skipped or omitted. In addition, any number of counters, state variables, warning semaphores, or messages might be added to the logical flow described herein, for purposes of enhanced utility, accounting, performance measurement, and/or troubleshooting aid. It is understood that all such variations are within the scope of the present disclosure.

The computing device 100, and/or other components described herein can each include at least one processing circuit. Such a processing circuit can include one or more processors and one or more storage devices that are coupled to a local interface. The local interface can include a data bus with an accompanying address/control bus or any other suitable bus structure.

The one or more storage devices for a processing circuit can store data and/or components that are executable by the one or processors of the processing circuit. The operating system 203, the application sandboxes 209a-n, or other components can be stored in one or more storage devices and be executable by one or more processors. Also, a data store, such as the access-restricted data store 206, can be stored in the one or more storage devices.

The operating system 203, the application sandboxes 209a-n, the executable instructions 226a-n, and other components described herein can be embodied in the form of hardware, as software components that are executable by hardware, or as a combination of software and hardware. If embodied as hardware, the components described herein can be implemented as a circuit or state machine that employs any suitable hardware technology. Such hardware technology can include one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

Also, one or more or more of the components described herein that includes software or program instructions can be embodied in any non-transitory computer-readable medium for use by or in connection with an instruction execution system such as a processor in a computer system or other system. Such a computer-readable medium can contain, store, and/or maintain the software or program instructions for use by or in connection with the instruction execution system.

The computer-readable medium can include physical media, such as, magnetic, optical, semiconductor, and/or other suitable media. Examples of a suitable computer-readable media include, but are not limited to, solid-state drives, magnetic drives, flash memory. Further, any logic or component described herein can be implemented and structured in a variety of ways. One or more components described can be implemented as modules or components of a single application. Further, one or more components described herein can be executed in one computing device or by using multiple computing devices.

It is emphasized that the above-described examples of the present disclosure are merely examples of implementations to set forth for a clear understanding of the principles of the disclosure. Many variations and modifications can be made to the above-described examples without departing substantially from the spirit and principles of the disclosure. All such modifications and variations are intended to be included herein within the scope of this disclosure.

Therefore, the following is claimed:

1. A system, comprising:
    a computing device comprising an operating system;
    a first application executable on the computing device in a first sandbox, wherein the first sandbox is provided by the operating system of the computing device, and the first application, when executed by the computing device, is configured to cause the computing device to at least:
        receive a request for access to data using an application programming interface (API) of a sandbox communications framework provided by the operating system, wherein the request is received from a second application executing on the computing device in a second sandbox provided by the operating system, and the data is stored in the first sandbox;
        retrieve a key-value pair from an access-restricted data store provided by the operating system, the key-value pair comprising a timestamp and an application identifier, wherein access to the access-restricted data store is restricted to a group of applications that comprises the first application and the second application; and
        provide the second application with access to the data using the API of the sandbox communications framework based at least in part on the key-value pair retrieved from the access-restricted data store, wherein the second application is authorized to access the data based at least in part on a determination that the application identifier identifies the second application, and the timestamp specifies a point in time within a predetermined period of time.

2. The system of claim 1, wherein the key-value pair was saved to the access-restricted data store by the second application.

3. The system of claim 1, wherein the first application is further configured to cause the computing device to at least:

generate an encryption key;
save the encryption key to the access-restricted data store; and
encrypt the data with the encryption key.

4. The system of claim 1, wherein the first application is further configured to cause the computing device to at least encrypt the data to send to the second application, wherein the data is encrypted using an asymmetric encryption algorithm with a public key corresponding to a private key that is accessible to the second application.

5. The system of claim 1, wherein the group of applications are signed with the same encryption key.

6. The system of claim 1, wherein the first application is further configured to cause the computing device to at least send an error message to the second application based at least in part upon the application identifier failing to identify the second application or the timestamp specifying a point in time outside the predetermined period of time.

7. The system of claim 1, wherein the first application is further configured to cause the computing device to at least determine whether the second application is included in a list of authorized applications.

8. A method, comprising:
receiving a request for access to data using an application programming interface (API) of a sandbox communications framework provided by an operating system, wherein the request is received from a first application executing on a computing device in a first sandbox provided by the operating system, the operating system, and the data is stored in a second sandbox provided by the operating system for a second application;
retrieving a key-value pair from an access-restricted data store provided by the operating system, the key-value pair comprising a timestamp and an application identifier wherein access to the access-restricted data store is restricted to a group of applications that comprises the first application and the second application; and
providing the second application with access to the data using the API of the sandbox communications framework based at least in part on the key-value pair retrieved from the access-restricted data store, wherein the second application is authorized to access the data based at least in part on the application identifier matching an identification of the first application and the timestamp specifying a point in time within a predetermined period of time.

9. The method of claim 8, wherein the key-value pair was saved to the access-restricted data store by the first application.

10. The method of claim 8, further comprising:
generating an encryption key;
saving the encryption key to the access-restricted data store; and
encrypting the data with the encryption key.

11. The method of claim 8, further comprising encrypting the data to send to the first application, wherein the data is encrypted using an asymmetric encryption algorithm with a public key corresponding to a private key available to the first application.

12. The method of claim 8, wherein access to the access-restricted data store is restricted to at least one of:
a group of applications signed with the same encryption key; or
a group of applications that share the same bundle seed identifier.

13. The method of claim 8, further comprising returning an error message to the first application based at least in part upon the application identifier failing to identify the first application or the timestamp specifying a point in time outside the predetermined period of time.

14. The method of claim 8, further comprising determining whether the application identifier of the first application is included in a list of applications authorized to access the access-restricted data store.

15. A non-transitory computer-readable medium storing a plurality of computer instructions executable by a computing device, the plurality of computer instructions being configured to cause the computing device to at least:
receive a request for access to data using an application programming interface (API) of a sandbox communications framework provided by an operating system, wherein the request is received from an application that has requested access to data stored in a sandbox provided by the operating system for a program;
retrieve a key-value pair from an access-restricted data store provided by the operating system, wherein the key-value pair comprises a timestamp and an application identifier, wherein access to the access-restricted data store is restricted to a group that comprises the program and the application; and
provide the application with access to the data using the API of the sandbox communications framework based at least in part on the key-value pair retrieved from the access-restricted data store, wherein the application is authorized to access the data based at least in part on a determination that the application identifier identifies the application and the timestamp specifies a point in time within a predetermined period of time.

16. The non-transitory computer-readable medium of claim 15, wherein the key-value pair was saved to the access-restricted data store by the application.

17. The non-transitory computer-readable medium of claim 15, wherein the program further comprises instructions that are configured to cause the computing device to at least:
generate an encryption key;
save the encryption key to the access-restricted data store; and
encrypt the data with the encryption key.

18. The non-transitory computer-readable medium of claim 15, wherein the program further comprises instructions that are configured to cause the computing device to at least encrypt the data to send to the application, wherein the data is encrypted using an asymmetric encryption algorithm with a public key corresponding to a private key available to the application.

19. The non-transitory computer-readable medium of claim 15, wherein the group shares the same bundle seed identifier.

20. The non-transitory computer-readable medium of claim 15, wherein the program further comprises instructions that are configured to cause the computing device to at least return an error message to the application based at least in part upon the application identifier failing to identify the application or the timestamp specifying a point in time outside the predetermined period of time.

* * * * *